2 Sheets--Sheet 1.
I. COOK.
Liquid-Meter.
No. 127,575. Patented June 4, 1872.
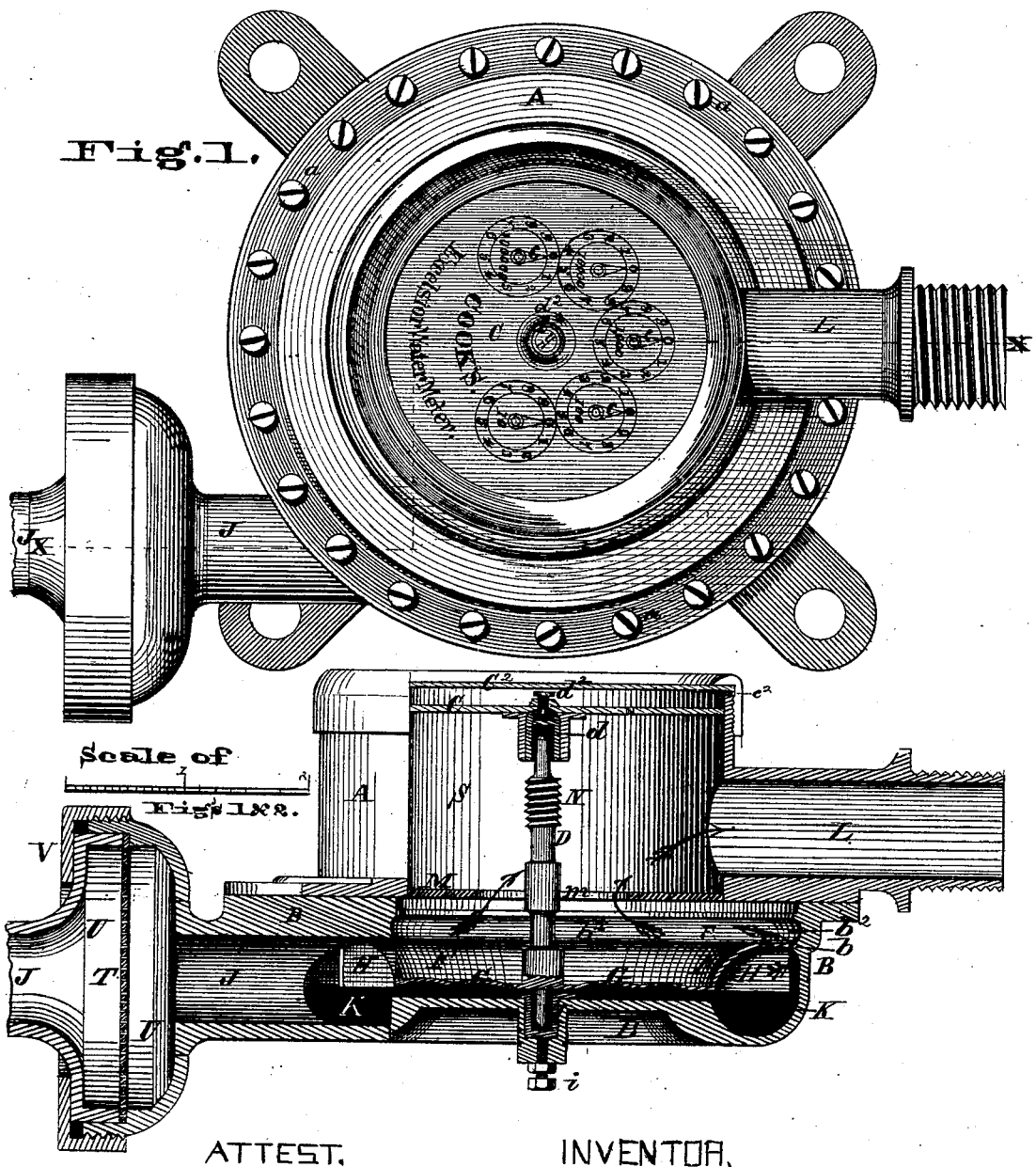
ATTEST.
Jas. L. Ewin
Walter Allen
INVENTOR,
Isaac Cook
By Knight Bros. Attys.

2 Sheets--Sheet 2.

I. COOK.
Liquid-Meter.

No. 127,575. Patented June 4, 1872.

ATTEST:
Jas. L. Ewin
Walter Allen

INVENTOR.
Isaac Cook
By Knight Bros. Attys.

127,575

UNITED STATES PATENT OFFICE.

ISAAC COOK, OF ST. LOUIS, MISSOURI.

IMPROVEMENT IN LIQUID-METERS.

Specification forming part of Letters Patent No. 127,575, dated June 4, 1872; antedated May 20, 1872.

Specification describing a certain Improved Meter for Liquids, invented by ISAAC COOK, of the city and county of St. Louis and State of Missouri.

My invention relates to a rotary meter for the accurate measurement and registry of the flow of water or other liquid, whether in smaller or larger quanties; and my improvement consists in a rotating wheel of peculiar construction, turning in a case so formed that the annular water-way between the periphery of the wheel and the case varies according to the amount of water passing through. The wheel upon its under side has a series of inclined buckets that are contained in an annular chamber formed by the case and the wheel, and the wheel is turned by the action of the water against the buckets; the water also raises the wheel by its action on the buckets, and upon the under side of the wheel, and escapes through the annular passage around the periphery of the wheel into the chamber containing the register-works.

Figure 3:
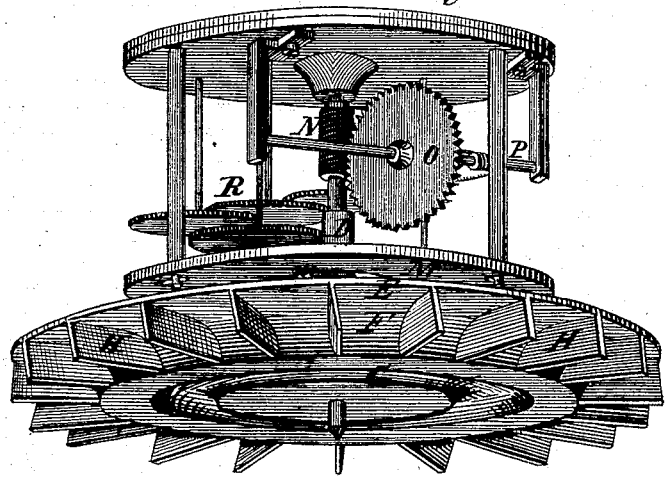
Figure 4:
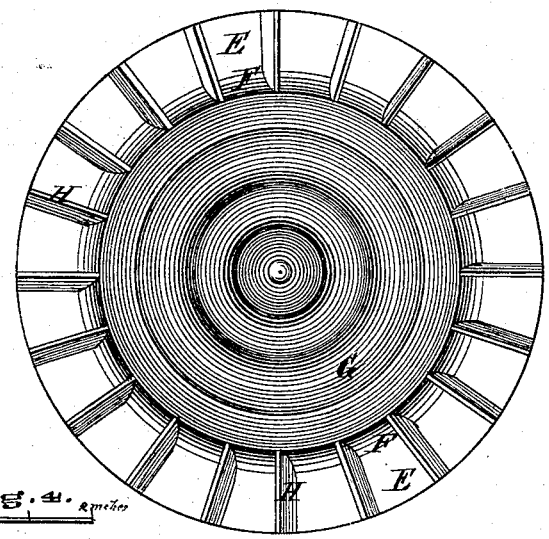

Figure 1 is a plan of my meter. Fig. 2 is a vertical section at the line X X, Fig. 1, the register-works being removed. Fig. 3 is an under perspective view of the meter-wheel and register-works. Fig. 4 is a plan view of the under side of the meter-wheel.

A is the upper member or cap of the case containing the register-gearing, and connected to the lower part B of the case by the screws $a$. C is the face of the register, the hands $c$ on which may indicate cubic feet, or any other measure. $C^2$ is the glass cover; $c^2$, a rubber gasket. In the center of the register-dial is seen a temper-screw, $d^2$, turning in the top of the journal-box $d$ of the upper end of the wheel-shaft or spindle D. The meter-wheel is carried by the shaft D, and has a horizontal edge, E, connected, by a curved portion, F, with the horizontal central part G. H are the buckets, extending downward from the part E, and outward or radially from the part F. These buckets are inclined somewhat forwardly, as shown most clearly in Figs. 3 and 4, so that as the water flows upward to escape around the periphery of the wheel it shall tend to turn the wheel forward. The lower end of the wheel-shaft D is stepped in a box, I, (preferably made of *lignum-vitæ*,) and beneath this box is a temper-screw, $i$, by which the box is raised or lowered to regulate the lower position of the wheel, the upper movement of the wheel being limited by the box $d$, regulated by the temper-screw $d^2$. J is a tangential pipe, through which the liquid enters the meter and flows into the annular water-passage K. In practice I have made the water-way K of about the same sectional area as the supply-pipe J and exit-pipe L, but I do not confine myself to any precise relative size. The buckets H do not occupy nearly all the space K, the water having free passage beneath and outside them, to allow its free distribution all around the wheel. The case B has a contracted portion, $b$, fitting neatly the periphery of the meter-wheel, and above this is a portion, $b^2$, of greater diameter, forming a swell in the interior of the case. This formation of the interior of the case causes the annular water-passage between the periphery of the meter-wheel and the case to increase as the wheel rises by the increased flow of water. M is a circular plate or diaphragm forming the top of the wheel-chamber and the bottom of the gear-chamber S in the case A, the shaft D passing up through a central aperture, $m$, in the plate, and the water all passing through the same aperture, and circulating among the gearing to prevent the deposit of sediment in the chamber, and to act as a lubricant to the gearing. N is a worm on the shaft D, engaging a worm-wheel, O, whose shaft P has a worm engaging one wheel of a system of register-gearing, R, (not necessary to be described particularly, as the general arrangement of such is well known.) This gearing is contained in a chamber, S, through which the water has free passage, escaping through the pipe L. T is a perforated plate or gauze strainer, placed in a chamber, U, and confined by a union coupling, V, that may form the walls of the chamber, as shown. The object of this strainer is not to prevent the passage of the finer impurities that may be suspended in the water, but to detain anything of sufficient size to clog the meter. The strainer T and chamber U may be made of any desired size according to the character of the water. The upper end of the shaft or spindle D may be tipped with hard steel or other hard metal, and a center plate of like substance may be let into the journal-box $d$ to receive the impact of the point when the meter-wheel is raised to its highest position by the water.

My meter, as shown, is intended for five-eighths-inch water-piping, but the meters may be made of dimensions to suit any size of pipe.

The operation of my meter is as follows: The water or other liquid enters, passing through the strainer T in the pipe J, impinges against the buckets H, and also causes a current in the water-way K. The pressure of water beneath the wheel raises the latter more or less according to the quantity passing through, so that the water shall find passage all around the periphery, whether the flow is small or great. The water in ascending presses against the rear sides of the inclined buckets H, and aids in turning the wheel. In an ordinary flow of water the conical ends of the spindle D would not be in contact with the ends of either of the boxes $d$ or I, but the wheel would be sustained by the upward pressure of the water beneath it, so that the friction in the journal-boxes would be very slight. The motion of the shaft or spindle D is communicated to the register-gears and indicated by the hands $c$ of the same.

I claim as my invention—

1. The meter-wheel consisting of a disk, E F G, furnished with radial buckets H, and turning in an inclosing-case, B, substantially as and for the purpose described.

2. The wheel E F G H, carried upon a vertically movable shaft, D, substantially as and for the purpose described.

3. The case B, having an interior rib, $b$, fitting the periphery E of the meter-wheel when in its lowest position, and a recessed or swelled portion, $b^2$, of greater diameter to allow an increased flow of water when the wheel is raised, all substantially as set forth.

4. The register-gear chamber S in the cap A, when arranged as shown, so that the body of water is compelled to pass therethrough, substantially as and for the purpose described.

In testimony of which invention I hereunto set my hand.

ISAAC COOK.

Witnesses:
SAML. KNIGHT,
STEPH. BERNARD.